Feb. 4, 1930.  H. E. ANDERSON  1,745,345
SEAL FOR AIR BRAKE NONPRESSURE HEADS
Filed May 5, 1928    2 Sheets-Sheet 1
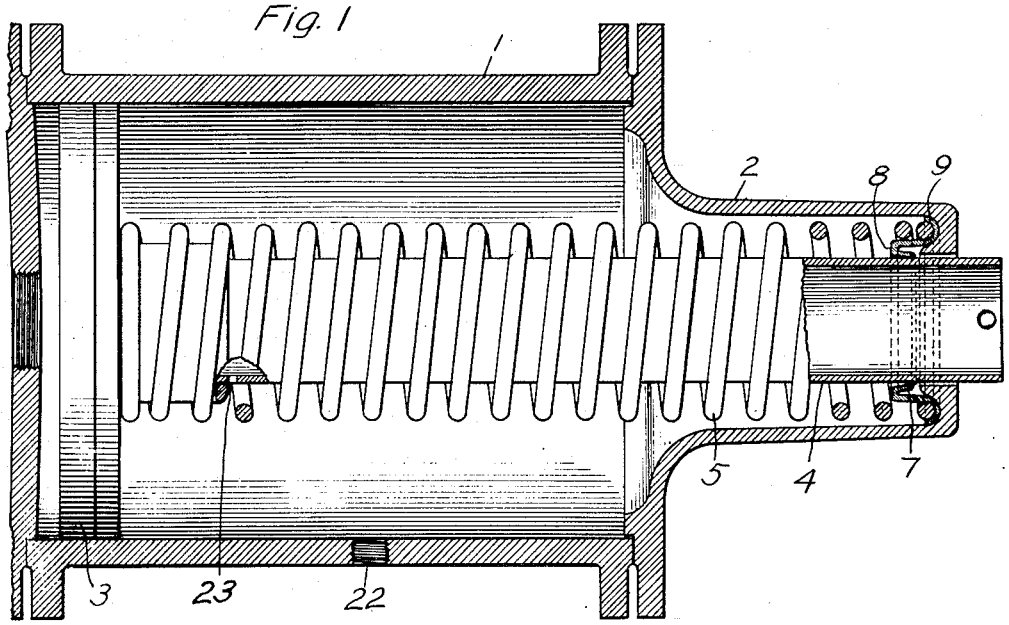
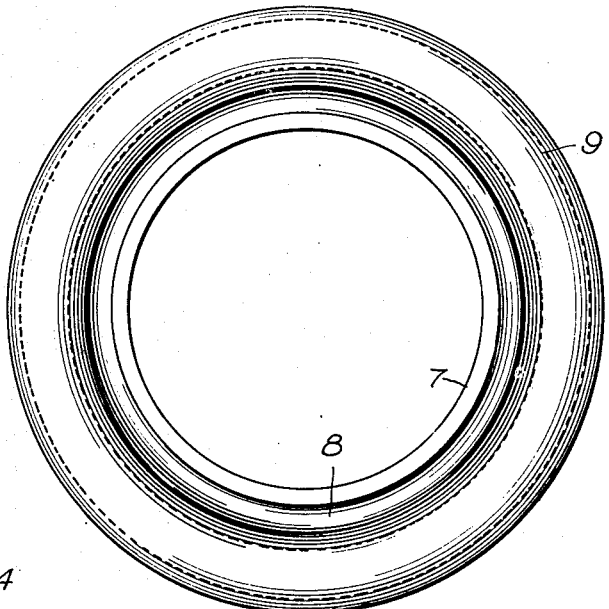
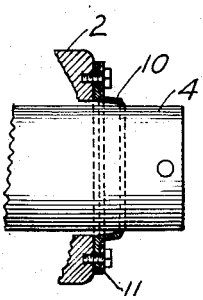
INVENTOR.
Harley E. Anderson.
BY Thorp & Thorpe
ATTORNEYS.

Feb. 4, 1930.  H. E. ANDERSON  1,745,345
SEAL FOR AIR BRAKE NONPRESSURE HEADS
Filed May 5, 1928  2 Sheets-Sheet 2

INVENTOR.
Harley E. Anderson,
BY Thorpe&Thorpe.
ATTORNEYS.

Patented Feb. 4, 1930

1,745,345

UNITED STATES PATENT OFFICE

HARLEY E. ANDERSON, OF KANSAS CITY, MISSOURI, ASSIGNOR TO GUSTIN-BACON MANUFACTURING COMPANY, OF KANSAS CITY, MISSOURI, A CORPORATION OF MISSOURI

SEAL FOR AIR-BRAKE NONPRESSURE HEADS

Application filed May 5, 1928. Serial No. 275,456.

This invention relates to seals for nonpressure heads of railway car air brake cylinders. It has always been difficult to exclude water, dust and dirt from entering non-pressure heads around the piston rod as said rod has a relatively loose fit in the non-pressure head. The rod must fit loosely so that air may freely enter and exit to avoid the building up of a back pressure on the piston which would interfere with the proper application of the air brakes.

The prime object of this invention, therefore, is to provide a seal having a wiping contact with the piston rod of such character that it shall not interfere with the full travel of the piston or prevent the immediate escape of pressure tending to build up in front of the piston on the application of the brakes, and which on the return of the piston under the power of the spring, maintains a sufficiently tight wiping contact with the rod as to prevent a sudden inrush of dust or moisture laden air and which also wipes the rod clean of any foreign material which may adhere thereto.

It is believed desirable at this point to stress the fact that on the application of the brakes a non-pressure head must be so constructed that it will immediately open to allow the exit of air without building up pressure ahead of the piston, but that upon the release of the air, the piston slowly returns and the seal must maintain substantially continuous contact with the rod to wipe it clean of dirt or water and to prevent the air entering under atmospheric pressure from sucking or blowing dust or water into the cylinder.

With the general object named in view, the invention consists in certain novel and useful features of construction and organization of parts as hereinafter described and claimed; and in order that it may be fully understood, reference is to be had to the accompanying drawings, in which:

Figure 1 is a central vertical section through an air brake cylinder of the type used in freight equipment, provided with a seal embodying the invention.

Figure 2 is a front elevation of a seal.

Figure 3 is a reduced central vertical section of a modified form of seal.

Figure 4:
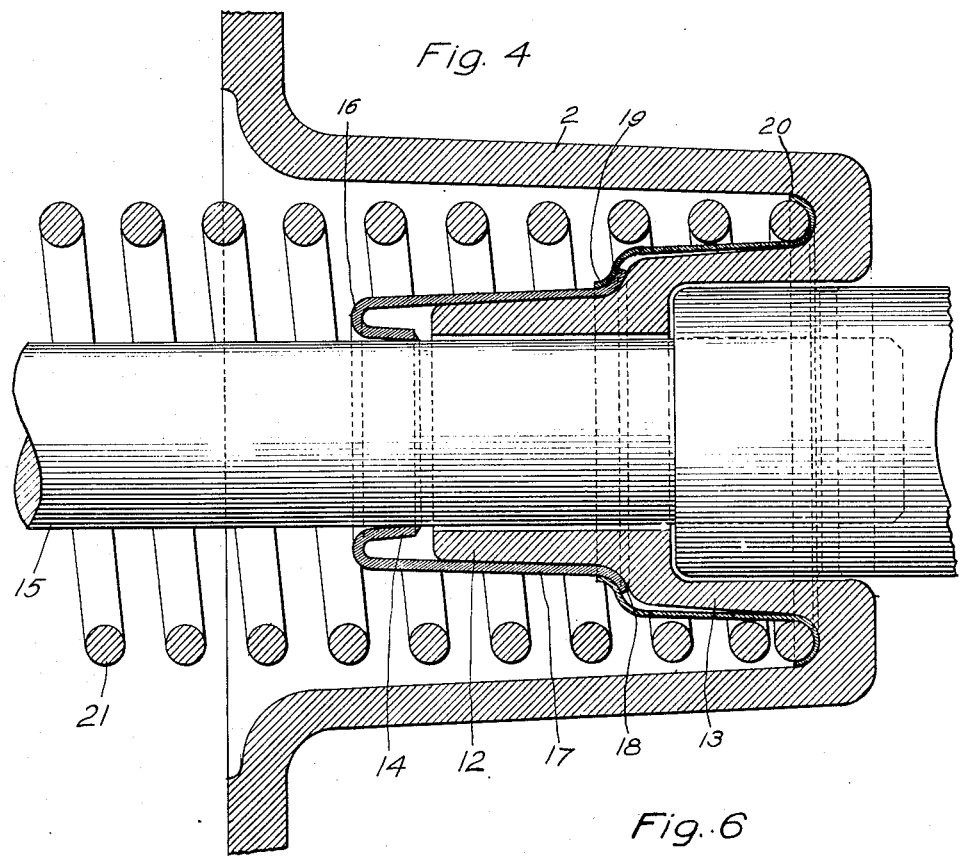
Figure 4 is an enlarged central vertical section through one end of the non-pressure head of passenger equipment to illustrate the seal of the invention.

In the said drawings, where like reference characters identify corresponding parts in all of the figures, 1 indicates an air brake cylinder equipped at one end with a non-pressure head 2, and containing the customary brake piston 3 and hollow piston rod 4. The hollow piston rod projects through an over-size opening in the non-pressure head and is moved outwardly by air pressure for the setting of the brakes and is returned to normal position by the expansion spring 5 loosely encircling the hollow piston rod as illustrated. All of the above equipment is of standard construction and as the opening in the non-pressure head through which the hollow piston rod extends is large so that the hollow piston may travel without undue resistance and without the setting up of a back pressure within the non-pressure head, water and grit readily enter the cylinder.

In order to seal the end of the non-pressure head against the entry of water and grit and at the same time to avoid sealing the same against the escape of air upon the operation of the piston to set the brakes, I provide a seal comprising a portion 7 extending substantially parallel to the hollow piston rod and having wiping contact therewith. The edge of said seal toward the piston 3 extends angularly outward and is then bent back upon itself to form a U-bend 8 and terminates in a curved portion 9 of contour to fit the interior face of the end of the non-pressure head 2 and to receive the end of the coiled spring 5 by which it is securely held in position sufficiently tight to eliminate air leakage, or the passage of foreign materials.

With a sealing member of the shape outlined, it will be apparent that the natural tendency of the semi-flexible material will be to bend at 8 upon the outward travel of the piston which, of course, leads to the forcing of air out of the non-pressure head, the portion 7 expanding outwardly away from the hollow piston rod. Upon the return travel of the piston under the influence of the spring 5, it will be evident that the non-pressure head may not be positively sealed as air under atmospheric pressure must enter behind the piston as it moves rearwardly. It will be understood that the piston does not rapidly return under the action of the spring 5 but gradually returns to such position and that air enters slowly behind the piston. It has been found in actual practice that a seal constructed in accordance with this invention effectively maintains a wiping contact with the exterior of the hollow piston rod and effectually prevents the entry of water, dust or grit into the cylinder, but does not materially slow up the return of the piston even though the natural tendency of the air at atmospheric pressure is to press portion 7 tightly against the piston rod. This operation is probably due to the roughness of the piston rod.

In Figure 3 a modified form is shown, this form comprising a portion 10 extending substantially parallel to the hollow piston rod and in wiping contact therewith, said seal being in abutment with the exterior face of the non-pressure head 2 and being held in position by a clamp ring 11. The method of operation of this seal is substantially similar to the seal above described.

Figure 5:
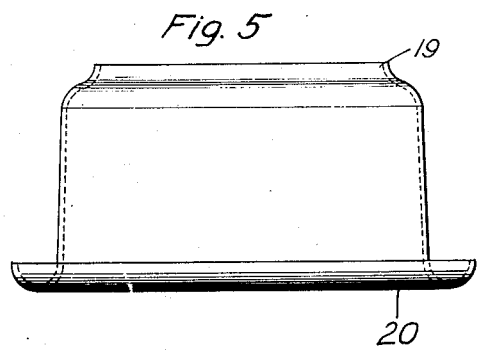
Figure 5 is a side elevation of a retaining cup forming a part of the construction shown in Figure 4.
Figure 6:
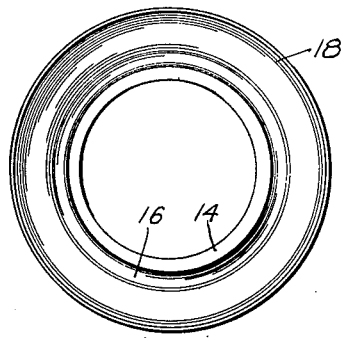
Figure 6 is a front view of the seal shown in Figure 4.

As different equipment is used with passenger cars, reference is now made to Figures 4 to 6 inclusive, in which the end of the non-pressure head is inwardly extended to provide a pair of tapering shoulder portions 12 and 13. With this type of construction, 14 indicates the seal portion having a wiping contact with the piston rod 15, said portion 14 being connected by a bend 16 to a sleeve 17 snugly and air-tightly fitted on tapered shoulder 12 of the non-pressure head. The end of the sleeve 17 is flared outwardly as at 18. To engage the flared portion 18 of the seal and tightly clamp same to the non-pressure head, a clamping cup having a flanged portion 19 for overlapping and clamping the end portion 18 of the seal is now slipped over portion 13 of the non-pressure head as illustrated. The end of the clamping cup is formed with a curved flange 20 for receiving the end of the piston spring 21, as shown. As soon as the parts are assembled, the spring 21 will clamp the cup against the end of the non-pressure head, and said cup will in turn tightly clamp the end of the seal to the non-pressure head, as will be readily understood. The operation of this device is in all respects similar to the operation of the device above described, the sleeve maintaining air tight contact with the shoulder portion 12 of the non-pressure head, the exit and entry of air being accommodated by the flexing of the U-bend 16 as above-described.

In Figure 1 a threaded opening 22 is shown in the brake cylinder to which a pipe leading to a slack adjuster is sometimes connected on passenger equipment, it being understood that as soon as the piston uncovers said pipe the air in the cylinder effects operation of the slack adjuster. Under some conditions it may occur that the seal will perhaps create enough back pressure in front of the piston to operate the slack adjuster and in order to guard against such a contingency, a small hole 23 is bored through the hollow piston rod adjacent the piston to relieve such pressure. It will be noted that the hole is at the far end of the hollow piston rod and that it will consequently be impossible for foreign material to enter therethrough.

From the above description it will be apparent that I have produced a device embodying the features of advantage set forth as desirable in the statement of the objects of the invention, and which is susceptible of modification in minor particulars without departing from the principle and scope of the appended claims.

I claim:

1. In a brake having a brake cylinder, a non-pressure head, a piston and a piston rod extending through an opening in said head, a flexible seal which encircles a piston rod, and is in wiping contact therewith, said seal being provided with a U-bend, the outer leg of the U terminating in a flanged portion, said flange being curved in cross section.

2. In a brake cylinder having a non-pressure head, a piston in said cylinder, a brake cylinder piston rod extending through an opening in said head and a coil spring which surrounds said rod and bears against said piston and a portion of said head, a flexible seal comprising a flanged portion which conforms to a portion of the contour of said head and which extends intermediate the end of said spring and said head and abuts the portion to which it conforms, and a cylindrical portion which surrounds said rod and is in wiping contact therewith, the cylindrical portion of the seal being adapted to expand or contract upon development of a pressure or vacuous condition respectively within the cylinder.

3. In a brake cylinder having a non-pressure head, a piston in said cylinder, a brake cylinder piston rod extending through an opening in said head and a coil spring which surrounds said rod and bears against said piston and said head, a flexible seal comprising a flanged portion which extends intermediate the end of said spring and said head and abuts a portion of said head and a cylindrical portion which surrounds said rod and is in wiping contact therewith, the cylindrical portion of the seal being adapted to expand or contract upon development of a pressure or vacuous condition respectively within the cylinder.

4. In a brake having a brake cylinder, a non-pressure head, a piston and a piston rod which extends through an opening in said head, a flexible seal comprising a flanged portion coinciding with the contour of said head, and a double walled cylindrical portion which surrounds said rod, the inner wall of which is in wiping contact therewith, the said cylindrical portion being adapted to expand or contract upon development of a pressure or vacuous condition respectively within the cylinder, and means to clamp said flanged portion to said head.

5. In a brake having a brake cylinder, a non-pressure head, a piston and a piston rod extending through an opening in said head, a double-walled seal of ring form, one wall being located within and spaced concentrically from and integrally united at one end to the corresponding end of the other wall, and the last-named wall being provided at its opposite margin with an external circumferential flange.

6. In a brake having a brake cylinder, a non-pressure head having an annular surface curved in cross section, a piston and a piston rod which extends through an opening in said head, a flexible seal comprising a curved flanged portion which coincides with the annular curved surface on said head, and a cylindrical portion which surrounds said head and is in wiping contact therewith, the cylindrical portion of the seal being adapted to expand or contract upon development of a pressure or vacuous condition respectively within the cylinder.

In testimony whereof I affix my signature.

HARLEY E. ANDERSON.